(12) United States Patent
Clymer

(10) Patent No.: US 10,935,668 B2
(45) Date of Patent: Mar. 2, 2021

(54) SYSTEM AND METHOD FOR DETERMINING GEOLOCATION OF A SIGNAL SOURCE

(71) Applicant: BAE SYSTEMS INFORMATION AND ELECTRONIC SYSTEMS INTEGRATION INC., Nashua, NH (US)

(72) Inventor: Richard E. Clymer, Concord, NH (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 204 days.

(21) Appl. No.: 16/114,973

(22) Filed: Aug. 28, 2018

(65) Prior Publication Data

US 2020/0072982 A1 Mar. 5, 2020

(51) Int. Cl.
| | | |
|---|---|---|
| G01S 19/42 | (2010.01) | |
| G01S 19/17 | (2010.01) | |
| G01S 5/02 | (2010.01) | |
| G01S 3/48 | (2006.01) | |
| G01S 5/04 | (2006.01) | |
| G01S 3/00 | (2006.01) | |
| G01S 5/00 | (2006.01) | |
| G01S 19/00 | (2010.01) | |

(52) U.S. Cl.
CPC ............. *G01S 19/42* (2013.01); *G01S 19/17* (2013.01); *G01S 5/0221* (2013.01); *G01S 5/0242* (2013.01)

(58) Field of Classification Search
CPC .......... G01S 5/0205; G01S 3/46; G01S 11/04; G01S 5/06
See application file for complete search history.

(56) References Cited

U.S. PATENT DOCUMENTS

| | | | | |
|---|---|---|---|---|
| 4,728,958 A | * | 3/1988 | Choate | G01S 5/02 342/424 |
| 5,227,803 A | * | 7/1993 | O'Connor | G01S 5/04 342/442 |
| 5,361,073 A | * | 11/1994 | Hansen | G01S 5/04 342/381 |
| 6,271,791 B1 | * | 8/2001 | Bruzzone | G01S 3/48 342/442 |
| 6,670,920 B1 | * | 12/2003 | Herrick | G01S 5/06 342/378 |

(Continued)

OTHER PUBLICATIONS

International Search Report, PCT/US19/48106, dated May 14, 2020, 16 pages.

*Primary Examiner* — Bernarr E Gregory

(74) *Attorney, Agent, or Firm* — Sand, Sebolt & Wernow LPA

(57) ABSTRACT

An antenna receiver has antenna elements that are arranged in an array and spaced apart from each other at a distance greater than one-half wavelength of the highest operating frequency of a signal that is to be detected by the antenna receiver. The antenna receiver has geolocation logic that uses the inter-element phase difference measurements to obtain a location of the signal source. The change in the inter-element phase differences enables the elements to be spaced apart at great distances, which is beneficial for the physical construction of the platform, as the elements may be easily placed at convenient locations for conformal aerodynamic properties.

18 Claims, 3 Drawing Sheets

(56) References Cited

U.S. PATENT DOCUMENTS

| | | | | |
|---|---|---|---|---|
| 7,132,961 B2* | 11/2006 | Yannone | ................. | G01S 11/04 |
| | | | | 340/961 |
| 7,233,285 B2* | 6/2007 | Struckman | ............... | G01S 5/04 |
| | | | | 342/451 |
| 7,268,728 B1* | 9/2007 | Struckman | ............... | G01S 5/04 |
| | | | | 342/424 |
| 2006/0114157 A1* | 6/2006 | Kolanek | ............... | G01S 3/46 |
| | | | | 342/424 |
| 2010/0009644 A1* | 1/2010 | Izumi | ...................... | G01S 3/48 |
| | | | | 455/132 |
| 2012/0313816 A1* | 12/2012 | Menegozzi | ............... | G01S 3/48 |
| | | | | 342/357.25 |
| 2013/0229310 A1* | 9/2013 | Parks | ........................ | G01S 3/46 |
| | | | | 342/417 |
| 2013/0271323 A1* | 10/2013 | Joo | .......................... | G01S 3/48 |
| | | | | 342/442 |
| 2016/0033616 A1* | 2/2016 | Sen | .......................... | G01S 5/02 |
| | | | | 455/456.5 |
| 2017/0082722 A1* | 3/2017 | Kabel | .................. | G01S 5/0205 |
| 2018/0088201 A1* | 3/2018 | Fujio | ........................ | G01S 3/48 |
| 2018/0306887 A1* | 10/2018 | Robinson | ................. | G01S 3/48 |

\* cited by examiner

SYSTEM AND METHOD FOR DETERMINING GEOLOCATION OF A SIGNAL SOURCE

STATEMENT OF GOVERNMENT INTEREST

This invention was made with government support under Sub Contract No. 1170366 awarded by the United States Air Force. The government has certain rights in the invention.

TECHNICAL FIELD

The present disclosure relates generally to antennas, systems, and methods for geolocation. More particularly, the present disclosure relates to antenna receivers and methods of implementing the same for geolocation of a signal source using a rate of change between inter-element phase differences.

BACKGROUND

Background Information

Historically, an antenna receiver receives one or more signals by scanning frequency bands and determining that signals exist within a set of parameters inside that frequency band. For example, the antenna receiver may detect the frequency of the signal, its pulse width, its pulse repetition interval, its modulation on the pulses, and the like, amongst other things. On detection of the signal, the receiver can alert an operator that there may be a signal of interest. Pulses may be used, such as a pulse train, to determine whether the signal of interest is a concern to the receiver. The receiver then may determine whether the located/detected signal is of interest and, if so, then the receiver may feed the signal to a geolocation system to determine a geolocation on the signal source.

SUMMARY

Issues continue to exist with methods and devices for geolocating a source of a signal. The present disclosure addresses these issues by providing a method and system for acquiring signals and making inter-element phase measurements needed for geolocation such that if an antenna receiver determines that the signal becomes of interest, the receiver does not need to return and observe a second signal to be used for geolocation.

In accordance with one aspect of the present disclosure, an exemplary embodiment of the present disclosure may provide a geolocation method comprising: acquiring a signal from a signal source in a receiver having a plurality of antenna elements, and the receiver mounted on a platform; measuring inter-element phase differences in the signal at a first time; measuring inter-element phase differences in the signal at subsequent times; determining the inter-element phase differences between the first time and the subsequent times; geolocating the signal source based on the change of the inter-element phase differences in the signal from the first time to subsequent times; and providing the signal source geolocation to a recipient. This exemplary method or another exemplary method may further include wherein measuring inter-element phase differences is accomplished by the receiver simultaneous to acquiring the signal. This exemplary method or another exemplary method may further include determining a first direction finding (DF) result from the signal at the first time; determining a first line of bearing to the signal source from the first DF result; determining a second direction finding (DF) result from the signal at the second time; and determining a second line of bearing to the signal source from the second DF result. This exemplary method or another exemplary method may further include determining the first line of bearing to the signal source based on phase differences across the antenna elements arranged in an array that are spaced apart by a distance more than one-half wavelength at an operating frequency maximum. This exemplary method or another exemplary method may further include moving the platform from a first position at the first time to a second (or subsequent) position at the second (or subsequent) time. This exemplary method or another exemplary method may further include determining an angle of arrival (AOA) of the signal at the first time based on the inter-element phase differences at the first time; and determining a second AOA of the signal at the second time based on the inter-element phase differences. This exemplary method or another exemplary method may further include establishing a base line with more than one-half wavelength at the operating frequency maximum between the antenna elements from a relative distance between the antenna elements for a localized phase. This exemplary method or another exemplary method may further include geolocating the signal source based on phase interferometry. This exemplary method or another exemplary method may further include maintaining the receiver at a single state while acquiring the signal and geolocating the signal source. This exemplary method or another exemplary method may further include executing geolocation instructions in a processor carried by the receiver on the platform simultaneous to acquiring to the signal. This exemplary method or another exemplary method may further include storing inter-element phase differences in at least one non-transitory computer readable storage medium to store the inter-element phase differences; storing the inter-element phase differences between the first time and the subsequent times; and geolocating the signal source based on the inter-element phase differences from the signal at a later time after acquiring the signal. This exemplary method or another exemplary method may further include storing inter-element phase differences in at least one non-transitory computer readable storage medium to store the inter-element phase differences; storing the change of the inter-element phase differences between the first time and subsequent times; and geolocating the signal source based on the inter-element phase differences in the signal simultaneously to acquiring the signal.

In accordance with another aspect of the present disclosure, an exemplary embodiment of the present disclosure may provide a geolocation system comprising: a moveable platform; an antenna receiver carried by the platform; a plurality of antenna elements arranged in an array defining a portion of the antenna receiver; signal acquisition logic in operative communication with the antenna receiver to acquire a signal; and geolocation logic in operative communication with the antenna receiver to geolocate a source of the signal based on inter-element phase differences of the signal acquired by at least two antenna elements between a first position of the platform at a first time and a subsequent position of the platform at a subsequent time. This exemplary embodiment or another exemplary embodiment may further provide an element spacing distance between two elements in the array that is greater than one-half wavelength at an operating frequency maximum of the signal to be acquired. This exemplary embodiment or another exemplary embodiment may further provide a processor in operative communication with the geolocation logic; and at least one non-transitory computer readable storage medium having instructions encoded thereon, that when executed by the processor, implement operations to determine phase differences of the signal between at least two antenna elements and to determine the inter-element phase differences of the signal. This exemplary embodiment or another exemplary embodiment may further provide wherein the operations implemented by the instructions further include: determine the inter-element phase differences between at least two of the plurality of antenna elements at the first time and the subsequent times; determine the geolocation of the signal source based on the inter-element phase differences in the signal at a later time after acquiring the signal; geolocate the signal source based on the inter-element phase differences in the signal simultaneous to acquiring the signal.

In accordance with yet another aspect of the present disclosure, an exemplary embodiment of the present disclosure may provide an antenna receiver that has antenna elements that are arranged in an array and spaced apart from each other at a distance greater than one-half wavelength of the highest operating frequency of a signal that is to be detected by the antenna receiver. The antenna receiver has geolocation logic that uses the inter-element phase difference measurements to obtain a direction finding result that establishes a line of bearing to the signal source. Using the change in the inter-element phase differences over time enables the elements to be spaced apart at great distances, which is beneficial for the physical construction of the platform, as the elements may be easily placed at convenient locations for conformal aerodynamic properties.

BRIEF DESCRIPTION OF THE SEVERAL VIEWS OF THE DRAWINGS

Sample embodiments of the present disclosure are set forth in the following description, is shown in the drawings and is particularly and distinctly pointed out and set forth in the appended claims.

Similar numbers refer to similar parts throughout the drawings.

DETAILED DESCRIPTION

Figure 1:
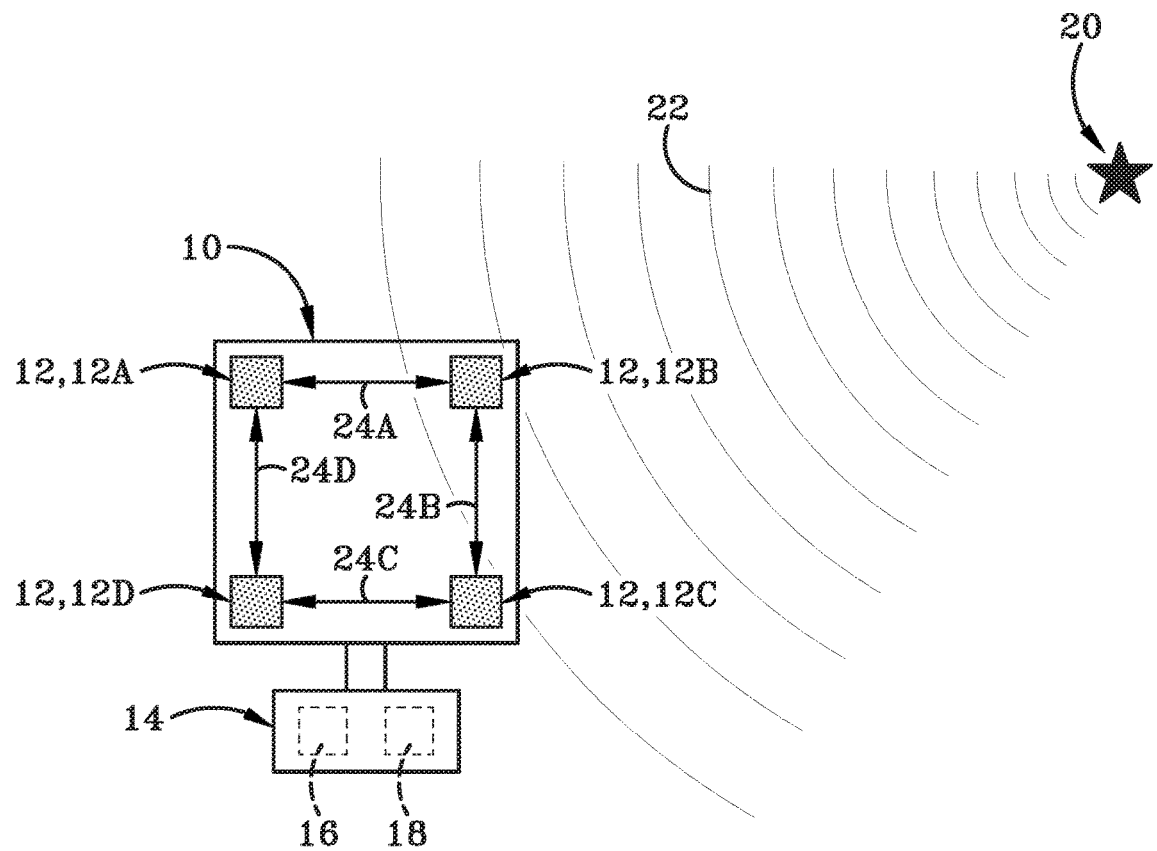
FIG. 1 is a diagrammatic view of an exemplary antenna receiver having antenna elements that are spaced apart from each other at a distance greater than one-half wavelength at the highest operating frequency of a signal for which the source is to be geolocated.

FIG. 1 diagrammatically depicts an antenna receiver in accordance with one aspect of the present disclosure generally at 10. Antenna receiver 10 may include a plurality of antenna elements 12, signal acquisition logic and geolocation logic, which are collectively shown at 14, a processor 16, and a memory or at least one non-transitory computer readable storage medium 18. The antenna receiver 10 is configured to geolocate a signal source 20 emitting a signal 22.

The antenna elements 12 may be arranged in array. In one particular embodiment, there may be a plurality of antenna elements 12, namely, a first antenna element 12A, a second antenna element 12B, a third antenna element 12C, and a fourth antenna element 12D. However, there may be more antenna elements or fewer antenna elements in other embodiments. The first antenna element 12A is spaced apart from the second antenna element 12B by a first distance 24A. The second antenna element 12B is spaced apart from the third antenna element 12C by a second distance 24B. The third antenna element 12C is spaced apart from the fourth antenna element 12D by a third distance 24C. The fourth antenna element 12D is spaced apart from the first antenna element 12A by a fourth distance 24D. In one particular embodiment, the distances 24A-24D are equal in magnitude such that the antenna elements 12A-12D can be arranged in a square orientation. In another particular embodiment, the antenna elements 12A-12D are spaced apart at intervals such that the distances 24A-24D are not equal such that the array is asymmetrical. In another particular embodiment, the array of antenna elements 12 may be defined by spacing distances 24 that have two equal distances of a first magnitude and two other equal distances of a second magnitude. For example, the array defined by the antenna elements 12 may be a rectangular array such that the first distance 24A is equal to the third distance 24C and the second and fourth distances 24B, 24D have the same magnitude, but are different than the first distance 24A and the third distance 24C.

Each antenna element 12 may be electrically connected with the logic 14, namely, the signal acquisition logic and the geolocation logic. As will be described in greater detail below, when each respective antenna element 12 identifies or acquires signal 22, the illumination of signal 22 is directed to logic 14 to execute instructions stored in the memory 18, as executed by processor 16, to determine the geolocation of the signal source 20.

In one particular embodiment, the distances 24A-D between elements 12 may be greater than one-half wavelength at an operating frequency maximum. In another embodiment, the first distance 24A between the first element 12A and the second element 12B is greater than one-half wavelength of the operating frequency maximum of signal 22. Additionally, the second distance 24B may be greater than one-half wavelength of the operating frequency maximum of signal 22. Still further, the third distance 24C between the third element 12C and the fourth element 12D may be greater than one-half wavelength of the signal 22 at its operating frequency maximum. Even further, the fourth distance 24D may be greater than one-half wavelength of the operating frequency maximum of the signal 22. Positioning the antenna elements 12 at distances 24A-24D that are greater than one-half wavelength of the signal's highest operating frequency enables each respective antenna element 12 to be placed at different locations on a platform that carries the antenna receiver 10. According to one aspect, this can be beneficial because it allows greater spacing between the antenna elements 12 to overcome physical constraints of the platform.

For example, if the platform is a moving vehicle that is more than a few meters long and more than a few meters wide, the first antenna element 12A may be positioned near a forward end of the platform, the second element 12B may be positioned near a first side of the platform, the third element 12C may be positioned near a rear end of the platform, and the fourth antenna element 12D may be positioned near a second side of the platform. This may prove advantageous in one particular example where normal tight spacing of antenna elements 12 at distances 24 is less than one-half wavelength of the highest operating frequency and typically constrain the antenna elements 12 to a small region on the platform. For example, when a conventional antenna array requires a spacing distance of a maximum of one-half wavelength of the signal 22 at its highest operating frequency, the physical constraints on the antenna receiver 10 require to be fabricated in very small spaces. While conventional antennas may have useful applications, it would still be advantageous to provide more flexibility that would enable the antenna elements 12 to be spaced apart at greater distances (i.e., greater than one-half wavelength above the signal 22 at its highest operating frequency). In furtherance to this example, and as will be discussed below with reference to FIG. 2, when the platform is an aircraft, the first element 12A may be located near the nose, the second element 12B may be located near the tail (which provides the first spacing distance 24A that is more than a few meters away and greater than one-half wavelength of the operating frequency maximum). The third element 12C may be located on a first wing and the fourth element 12D may be located on a second wing (which provides the third spacing distance 24C that is more than a few meters away and greater than one-half wavelength of the operating frequency maximum).

Both the signal acquisition logic and the geolocation logic, namely, logic 14, is in operative communication with the plurality of antenna elements 12 that are arranged in an array. More broadly, logic 14 is in operative communication with the antenna receiver 10. The geolocation logic 14 is configured to acquire the signal and geolocate the signal source 20. As will be described in greater detail below, the manner in which the geolocation logic 14 determines the geolocation of the signal source 20 is accomplished by processing the rate of change in inter-element phase difference measurements or inter-element phase differences of the signal 22 acquired by at least two antenna elements 12, such as the first element 12A and the second element 12B. The acquisition logic may determine the change in inter-element phase differences between a first position of the platform carrying the antenna receiver 10 at a first time and a second position of the platform carrying the antenna receiver 10 at a second time. It is understood that a "second" position or time is representative of a second, third, fourth and or any subsequent position and time and that the inter-element phase differences may be determined between all possible positions and times.

Once the signal acquisition logic implements operations to determine phase differences of the signal 22 between at least two antenna elements 12, the signal acquisition logic provides these differences to the geolocation logic. Then geolocation logic 14 utilizes the phase differences between at least two antenna elements 12 over time to determine the geolocation of the signal source 20. In further detail, the signal acquisition logic 14 determines the phase differences in the signal 22 between the first element 12A and the second element 12B at a first time. Then, the signal acquisition logic 14 determines the phase differences of the signal 22 between the first element 12A and the second element 12B at a second time. The change in the phase differences is utilized by the geolocation logic 14 to determine a direction-finding result that obtains a line of bearing from the platform to the signal source 20.

Figure 2:
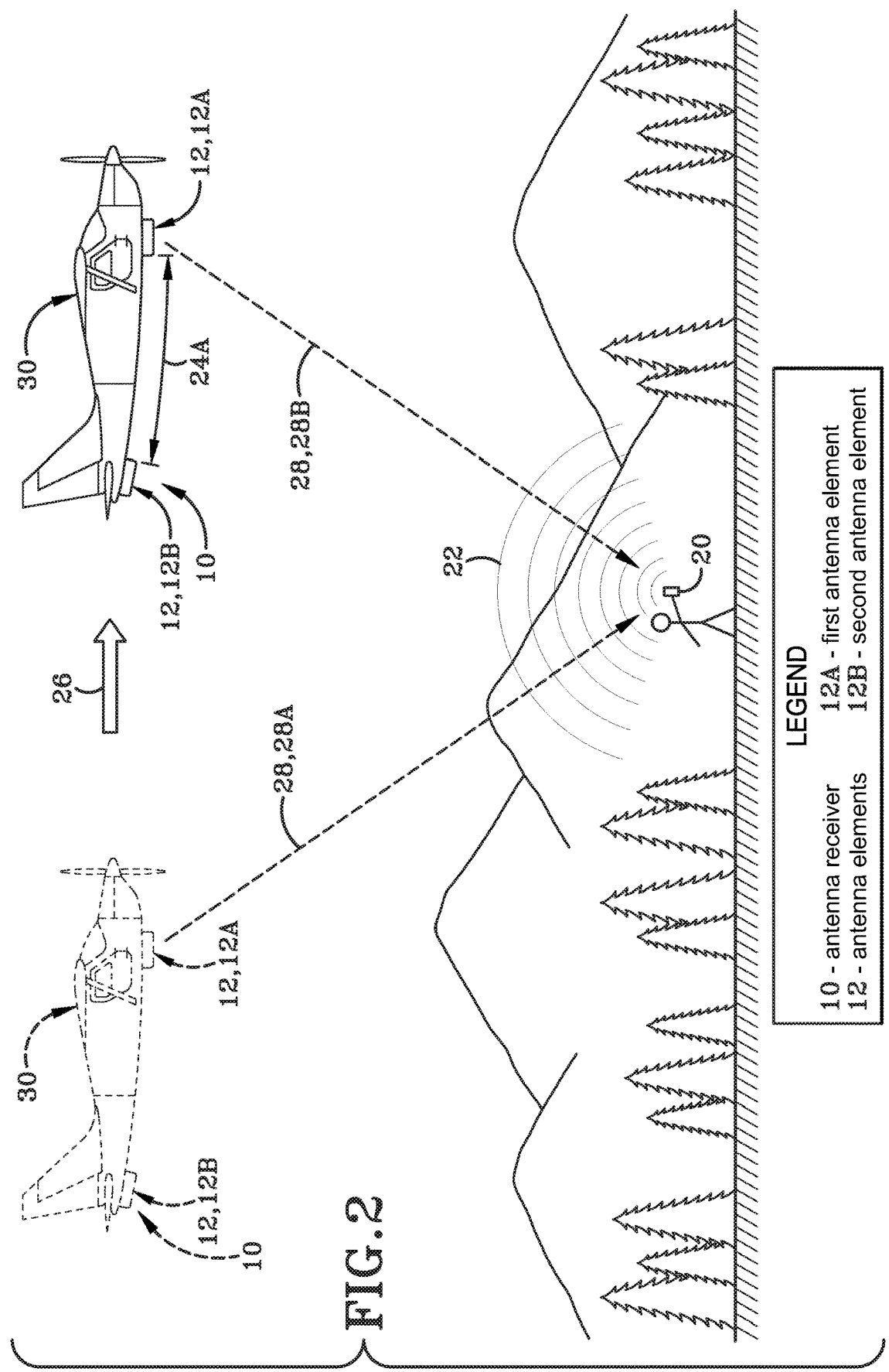
FIG. 2 is a diagrammatic operational view of a platform carrying the antenna receiver of FIG. 1 to geolocate the signal source using inter-element phase differences between first and second positions of a platform.

FIG. 2 depicts a platform 30 carrying the antenna receiver 10 and positioning the first antenna element 12A at a spacing distance 24A from the second antenna element 12B. In this scenario, the third antenna element 12C and the fourth antenna element 12D may be carried by one of the fixed wings on the platform 30, which is embodied as an aircraft. However, the platform 30 may be any moveable vehicle without departing from the scope of the present disclosure. For example, platform 30 may be any aerial vehicle, regardless of whether manned or unmanned, such as a fixed wing aircraft, a rotorcraft, a drone, a UAV, a satellite, a space shuttle, or the like. Additionally, platform 30 may be any moveable land-based vehicle, such as a tank or truck or, alternatively may be any sea-based vehicle, such as a ship or an amphibious vehicle. Regardless of the type of vehicle, platform 30 is configured to move from a first position to a second position.

FIG. 2 depicts the first position of platform 30 in dashed lines. The second position of platform 30 is depicted in solid lines. Movement of the platform 30 from the first position to the second position is depicted by arrow 26. With continued reference to FIG. 2, first element 12A is positioned near the nose of the platform 30 and the second element 12B is positioned near the tail of the platform 30. When platform 30 is a fixed wing aircraft, the first spacing distance 24A may be multiple meters apart. Thus, when operating in higher frequencies, there may be many wavelengths of a potential signal 22 separating the first element 12A from the second element 12B. For example, if the signal 22 emitted by source 20 has a wavelength of one inch and the first spacing distance 24A is 50 feet, then there are approximately 600 wavelengths between the first antenna element 12A and the second antenna element 12B. In a conventional antenna array, the spacing distance between element 12 must be less than one-half wavelength apart at the highest frequency of the signal 22 (i.e., one-half inch for a wavelength of one inch). Thus, with conventional technology, antenna elements 12A and 12B would be too far apart to detect accurately a direction finding (DF) result to obtain a line of bearing 28 to the signal source 20. The present disclosure uses logic 14 to identify the change of the phase differences between antenna elements 12 (i.e., inter-element phase difference measurements). By observing the change of the inter-element phase differences between the platform 30 at the first position and the platform 30 at the second position, the antenna receiver 10 is able to directly determine the target location.

With continued reference to this example, the present disclosure extends beyond measuring inter-element phase differences. Logic 14 uses, similar to a derivative, the rate at which the inter-element phase differences is changing. The measurement of how much the inter-element phase differences are changing enables the elements 12 to be placed at a farther distance than one-half wavelength. For this example, if the platform 30 is moving at the first position at a first time (T=0), the logic 14 indicates that the signal 22 is being generated from a direction that is any degrees from the nose of the aircraft/platform 30 directly off the left wing of the platform. The phase difference is measured between the left wing antenna element (i.e., third element 12C) and the right wing antenna element (i.e., fourth element 12D) at the same time (T=0). If the left wing antenna element (i.e., third element 12C) and the right wing antenna element (i.e., fourth element 12D) are 50 feet apart and are being measured at the same time (T=0), and the wavelength is one inch, there are approximately 600 wavelengths between the left antenna and the right antenna (50'×12"×1" wavelength=600 wavelengths). The signal difference needs to be less than one-half wavelength. Thus, depending on the array design, for 600 wavelengths, there could be over 600 possible answers of the signal location. Given this extraordinary amount of information, the present disclosure eliminates the high computing requirements that would be needed to process all of the possible answers and rather uses the phase differences between the inter-elements to determine the target location. The logic 14 determines a first angle of arrival (AOA) at the first time (T=0) which provides a first calculation used in conjunction with a second calculation obtained after the platform moves to the second position at a second later time (T=1). At the second time, the phase difference change between the antenna elements is observed to determine the target location. Thus, if the first angle was 42 degrees at T=0 and the second angle was 52 degrees at T=1, then the system is observing the remnant change in the incident phase. Depending on the signal frequency and the array design, if the platform flies to a third position that results in an angle of arrival of 62 degrees, there is only one geolocation spot on the earth that allows the signal phase to change in the way that the system is observing. In one embodiment, the system does not need to know the absolute phase difference, such as what is required in classic DF. Rather, the system may evaluate the phase change over time as the platform moves.

With continued reference to FIG. 2, the antenna receiver 10, namely, the signal acquisition logic, may acquire the signal 22 of interest and additional signals, which are not of interest, and recognize the signals illuminating at a given frequency. The receiver can store every acquired signal (those of interest and those not of interest) for later processing and filtering to determine whether some of the other signals that illuminate in the receiver becomes a signal of interest at a later time. By way of example, this may be accomplished through software instructions that filter the stored signal illuminations to determine whether the acquired signal that illuminates within the receiver should be investigated further. With continued reference to this example, instructions stored on the storage medium 18, when executed by the processor 16, work in conjunction with the receiver that stores and records every signal stream that it receives. The stored information on the receiver is then provided to the software modules that process and determine via successive processing steps to determine whether the observed signal is a signal of interest. The software modules can determine whether the signal is of interest by fundamental signal characteristics.

For example, consider a scenario where an emergency rescue team is searching for a distressed or deserted hiker stranded on a mountain or another remote location. The emergency rescue team will typically know that their emergency radio (i.e., the signal source 20) operates in a certain frequency band. The software module of the logic 14 may be set to filter and only flag or identify signals of interest that fall within the frequency bands of the emergency radio carried by the hiker. Thus, the signals 22 outside the desired frequency band may be rejected through the software modules and discarded or, alternatively, be saved in medium 18 for evaluation at a later time if it is later determined that the out-of-band signals become of interest. For example, if the emergency rescue team later determines that the stranded hiker had a different type of radio that is outside the frequency bands of normal emergency radios, the logic 14 can re-evaluate the signals that are outside the normal emergency radio frequency band. In this instance, the logic 14 may determine the change of the inter-element phase differences of the stored signal between the first positon and the second position of the platform. The logic 14 may then determine the change of the inter-element phase differences from the first position to the second position. The geolocation logic then uses the change of the inter-element phase differences from the first position to the second position to geolocate the location of the emergency radio that was operating outside the normal emergency radio frequency band. The geolocation then may be provided to the emergency rescue team that can revert to the geolocation of the emergency radio (i.e., the signal source 20) to look for the deserted or stranded hiker.

With continued reference to this non-limiting example, if there is a person sending an emergency distress signal in a rugged or harsh environment, that signal can be geolocated based on the single signal source and single stream of data emitted from the emergency radio transmitter. This is beneficial as emergency transmitters typically only have a short battery life. Thus, there may be only a short window of time in which the emergency transponder can emit a distress signal that is received or acquired by the antenna receiver 10. The antenna receiver 10 that receives the emergency distress signal will have all of the signal inter-element phase measurements to calculate the geolocation of the signal source so that the person sending the distress signal from the emergency transponder can be geolocated. Thus, the platform can fly over the region of the hiker a single time and gather all of the signal information needed to geolocate the hiker. So if the battery dies on the emergency radio from the hiker, the antenna receiver 10 can still geolocate the signal source even after signal emission has stopped.

By way of another example, for military applications, the same method may be equally applied to military applications where an enemy or adversary is trying to transmit a signal from a transmitter and the operator needs to determine the geolocation of the enemy signal source. The software modules of logic 14 may be written with instructions that can determine whether the observed signal is one that is typically used by a hostile adversary. If the adversary or enemy transmits its signal for a short time, then the system is able to determine and calculate with only a short stream of data the geolocation of the adversary signal source based on the inter-element phase measurements of the received or intercepted enemy signal. The software modules may filter all of the received and observed signals recorded in the antenna receiver to determine whether any of the observed signals fall within the hostile adversary frequency or band of frequencies. If one of the observed signals lies within a hostile adversary frequency band, then the geolocation process can be implemented to identify the geolocation of the signal source based on the rate of change of the inter-element phase measurement differences to determine the geolocation of the signal source. Once the geolocation of the signal source has been identified to the operator, the operator may then determine what additional steps need to be taken to either eliminate the threat or avoid the threat.

There are other signal parameters, in addition to frequency, that may be used to help determine whether the observed signal is a signal of interest. For example, for radar signals, pulse width of the signal may be utilized. This generally refers to a time duration along the electromagnetic radiation energy generating the signal that is activated. This can be generally in a range from about one second to continuous wave (CW). For example, if an enemy radar typically only has a pulse width from a first value A to a second value B and the receiver observes a continuous wave CW radar signal, the software modules may filter and remove the CW signal as a signal that is of no interest at this time. However, this CW wave may be stored in at least one non-transitory computer readable storage medium 18 such that if the CW wave becomes a signal of interest at a later time, the geolocation logic can execute its instructions to determine the geolocation of the signal source 20 based on inter-element phase in the CW wave between the first position of the platform at a first time and the second position of the platform at a second time.

Another parameter that may be utilized is pulse repetition interval. Pulse repetition interval refers to how often a pulse width is present or identified by the receiver. Different emitters have different pulse width repetition rates. Thus, if the operator knows that the signal source of interest, either an adversary or a stranded emergency radio, typically operates within a set of repetition rates, the software modules may filter all of the observed signals processed by the receiver to determine which could be of interest based upon their pulse width intervals or repetition rates.

Another parameter that may be used is the signal modulation. For example, if the emergency radio or an adversary typically utilizes an FM modulator and the observed signal was modulated by an AM modulator, then the software modules can filter the signals to reject the AM modulated signals as not being of interest.

The logic 14 of antenna receiver 10 may perform both signal acquisition functions and signal source geolocation. In one particular embodiment, the acquisition of the signal and the geolocation of the signal may occur substantially simultaneously. In another particular embodiment, the acquisition of the signal occurs first and the geolocation occurs subsequent to the acquisition of the signal. Thus, the antenna receiver 10 is designed such that a change in state is not required as the antenna receiver 10 performs a broadband acquisition function and a geolocation function.

The receiver determines the phase difference measurements of the incoming signal between elements 12 in the antenna array and then transmits phase difference measurements as the platform 30 moves from the first position to the second position to the geolocation logic or software to utilize the phase difference measurements to geolocate the signal source. The manner in which the receiver determines the phase difference measurements simultaneously or, at least closely simultaneously, to acquisition the incoming signal may be accomplished in a number of ways. In one particular example, the phase difference measurements may be accomplished through a time distance of arrival process, a Doppler shift process, or an amplitude and phase process. However, other known or future phase measurements are entirely possible.

In one particular embodiment, the computer/logic receiving the inter-element phase difference measurement data from the signal 22, received by the antenna receiver 10 that executes the geolocation technique or algorithm, may occur onboard the platform 30 or in conjunction with the antenna receiver 10. However, it is entirely possible for the system to be implemented with a computer that is remote from the antenna receiver 10. In this instance, the computer would receive the inter-element phase measurement data over a secure wireless connection such that the geolocation calculations of the signal source could occur in a safe location. Additionally, the computer may include at least one non-transitory computer readable storage medium to store the phase measurement to allow the geolocation to occur at a later time if necessary. Accordingly, the geolocation does not require it to occur simultaneously to the acquisition of the signal.

In one particular embodiment, the geolocation logic uses the inter-element phase differences to geolocate the signal by obtaining a line of bearing which comes from a direction-finding (DF) result. In the DF example of the present disclosure, the logic 14 uses the phase variations across the array of elements 12. However, amplitude may be used as well. In accordance with one aspect of the present disclosure, the logic 14 utilizes phase interferometry to geolocate the signal 22 acquired by the antenna receiver 10. Interferometry is a family of techniques in which electromagnetic waves are superimposed causing interference which may be utilized to extract information. The phase interferometry can provide a direction from the antenna receiver 10 to the signal emitter or signal source 20. The geolocation approach, either through amplitude or phase, then determines the DF of the emitter source 20. Since the antenna array is on the moving platform 30, a second measurement may be observed by the antenna receiver 10 which similarly calculates the phase measurements between the antenna elements to obtain a second DF at a second later time. The first DF and the second DF bearings may be used to triangulate the source location of the emitted signal. Thus, the geolocation of the signal emitter is determined based on the first DF and the second DF at a later time as observed by the antenna array on the moving platform.

As the platform moves while carrying antenna elements 12, the logic 14 can determine how the phase is changing relative to each respective antenna element. Even though there may be many wavelengths between each respective antenna element, the logic 14 may determine the relative phase differences between the two or the plurality of antenna elements. The logic 14 may determine, in real time or near real time, the phase differences between antenna elements 12 and determine the relative change in the phase difference which enables the system to establish a long base line with many wavelengths between the antenna elements that are using the relative distance between the antenna elements for its localized phase. Thus, the logic 14 observes how the difference between antenna elements 12 changes over time. This is beneficial as it enables the antenna elements to be spaced farther apart and does not require the antenna elements to be clustered at a short distance up to, at most, one-half wavelength. This is beneficial for airborne applications or other platform aerial applications where there may be physical constraints which require antenna elements to be spaced farther apart. As stated in one previous example, on an aerial platform, regardless of whether the aerial platform is manned or unmanned, one antenna element may be positioned near the nose of the aerial platform and another antenna element may be placed on a wing of the aerial platform and another antenna element may be placed on a tail of the aerial platform, as shown in FIG. 2. The spacing of element 12 on the aerial platform 30 enables the antenna receiver 10 to observe and determine the relative peak of the wave shift slightly as the platform 30 flies or moves.

In accordance with this exemplary aspect of the present disclosure, the platform moves from a first position to a second position. When the platform is at the first position, the antenna receiver acquires the signal and performs the inter-element phase difference measurement at the first position at a first time. Then the platform continues to move, such as fly, towards a second position at a later second time. At the second position at the later second time, the antenna receiver acquires the signal and performs the inter-element phase difference measurement calculations. The distance between the first position and the second position can be any value; however, as is understood with geolocation algorithms or processes, a greater distance would result in a more accurate identification of the geolocation of the signal source. For example, it may be possible for the platform to move 100 meters from the first position at the first time to the second position at the later second time and the geolocation algorithm or process be able to correctly identify the signal source location. However, the signal source location may be more accurately identified if the platform were to move 1,000 meters from the first position at the first time to the second position at the later second time.

Traditional DF arrays have inter-element spacing that is one-half wavelength or less at the highest operating frequency. In another particular embodiment, the spacing of the elements 12 defining the array of antenna receiver 10 may be larger than one-half wavelength at a highest operating frequency so long as the difference between spacing of the antenna elements is less than one-half wavelength. For example, if there is a first antenna array spaced apart from a second antenna array at a distance of four half wavelengths and a third antenna array spaced apart from the second antenna array by a distance of five half wavelengths, then the resultant difference is a one-half wavelength (5 one-half wavelengths minus 4 one-half wavelengths=1 one-half wavelength). This may provide an advantageous embodiment because it enables the antenna array to be longer to result in a larger aperture to obtain a more accurate DF result.

In accordance with another aspect of the present disclosure, the system and method described herein relate to radio signal transmissions and the geolocation of the signal source. However, it is entirely possible that the system of the present disclosure could be coupled to other sensors, such as infrared sensors or other technology to determine or predict where the signal source will move or translate to a later position after sending its first signal. For example, if an enemy is transmitting a signal, the system of the present disclosure could geolocate the signal source and additional sensors, such as infrared sensors, could highlight or be directed towards that location of the adversary to observe and detect whether the enemy or adversary makes additional movements in order to predict and locate the movement after the enemy generates the signal.

In accordance with one aspect of the present disclosure, one implementation of the system may need motion by the platform for the geolocation algorithm or process to identify the signal source location. However, there may be additional geolocation algorithms or processes available which would not need motion of the platform to identify the location of the signal source. For example, it may be possible to geolocate the signal source when there are three stationary antennas. For example, at each stationary tower, there may be a DF antenna array. The DF antenna array on each stationary tower would create a line of bearing towards the signal source. The location where the three line of bearings intersect would be the geolocation of the signal source. The DF antenna array may acquire the signal and obtain the relative phase measurements between the elements in the DF antenna array and use the relative phase measurements to determine the DF result.

In some implementations, it may not be practical to determine the angle of arrival of a signal, or its location, directly from a single measurement of two antennas that are a high number of wavelengths apart without movement of the platform 30. In this scenario, the antennas would have to be more closely spaced to resolve ambiguities and to provide single measurement angle of arrival.

Figure 3:
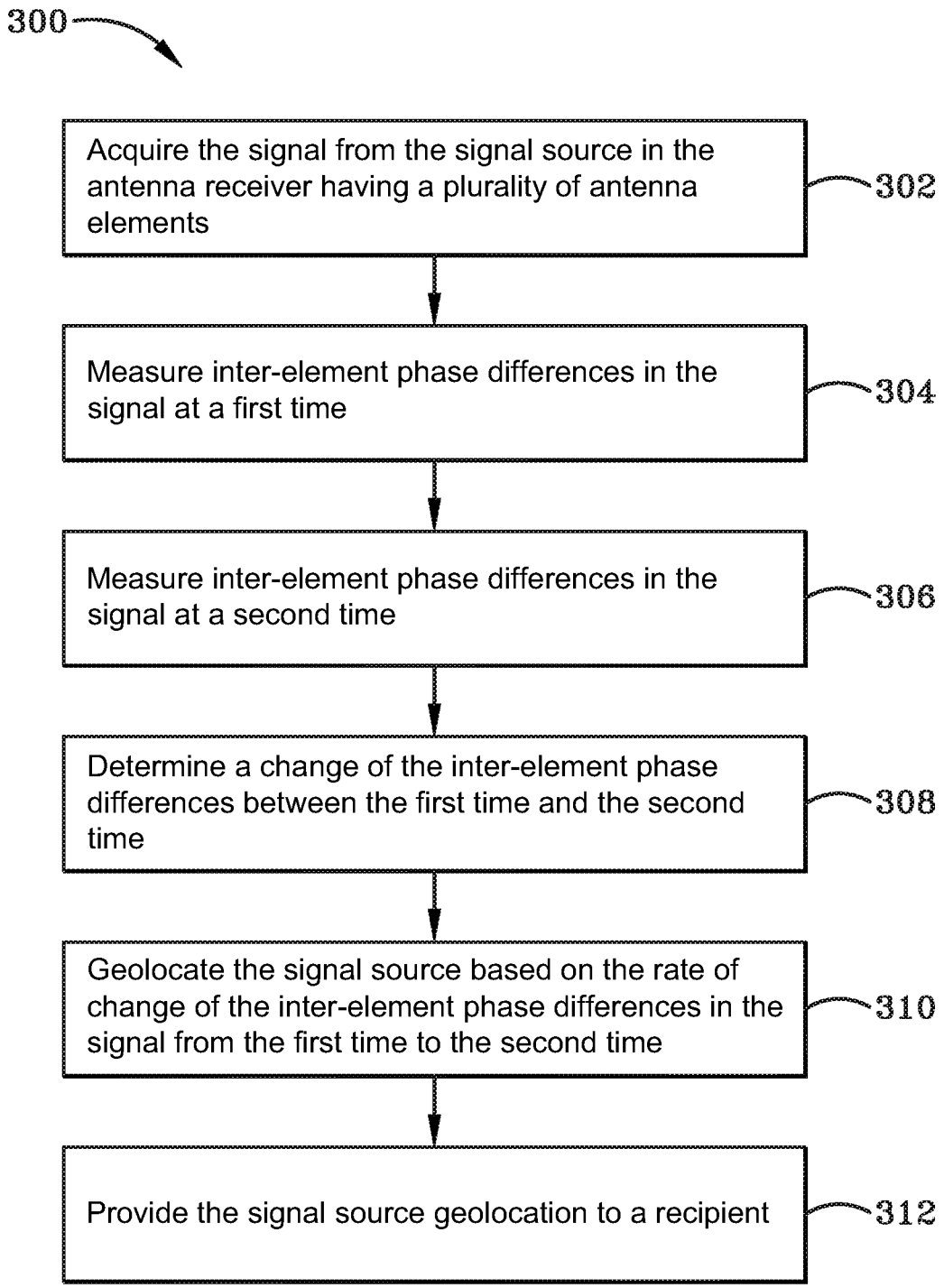
FIG. 3 is a flow chart of an exemplary method of the present disclosure.

FIG. 3 is a flow chart that depicts an exemplary method of geolocating a signal source generally at 300. The method 300 may include acquiring the signal 22 from the signal source 20 in the antenna receiver 10 having a plurality of antenna elements 12, and the receiver mounted on the platform 30, which is shown generally at 302. Method 300 may include measuring inter-element phase differences in the signal at a first time, which is shown generally at 304. Method 300 may include measuring inter-element phase differences in the signal at a second time, which is shown generally at 306. Method 300 may include determining a change of the inter-element phase differences between the first time and the second time, which is shown generally at 308. Method 300 may include geolocating the signal source 20 based on the rate of change of the inter-element phase differences in the signal 22 from the first time to the second time, which is shown generally at 310. Method 300 may include providing the signal source geolocation to a recipient, which may be a pilot of the platform 30 or another computer, which is shown generally at 312. Method 300 may further provide wherein measuring inter-element phase differences is accomplished by the receiver simultaneous to acquiring the signal. Method 300 may further provide determining a first direction finding (DF) result from the signal at the first time; determining the first line of bearing 28A to the signal source from the first DF result; determining a second direction finding (DF) result from the signal at the second time; and determining the second line of bearing 28B to the signal source from the second DF result. Method 300 may further provide determining the first line of bearing 28A to the signal source based on phase differences across the antenna elements 12 arranged in an array that are spaced apart by a distance more than one-half wavelength at an operating frequency maximum. Method 300 may further provide moving the platform 30 from a first position at the first time to a second position at the second time. Method 300 may further provide determining the AOA of the signal 22 at the first time based on the inter-element phase differences at the first time; and determining a second AOA of the signal 22 at the second time based on the inter-element phase differences. Method 300 may further provide determining relative phase differences on signal 22 waves between at least two of the plurality of antenna elements at the first time; and determining relative phase differences on signal waves between at least two of the plurality of antenna elements at the second time. Method 300 may further provide determining in near real time the phase differences between the antenna elements 12 at the first time; determining in near real time the phase differences between the antenna elements 12 at the second time; establishing a base line, based on the first DF and the second DF, with more than one-half wavelength at the operating frequency maximum between the antenna elements from a relative distance between the antenna elements for a localized phase. Method 300 may further provide geolocating the signal source based on phase interferometry. Method 300 may further provide maintaining the antenna receiver 10 at a single state while acquiring the signal and geolocating the signal source. Method 300 may further provide executing geolocation instructions in a processor carried by the receiver on the platform simultaneous to acquiring to the signal. Method 300 may further provide storing inter-element phase differences in at least one non-transitory computer readable storage medium to store the inter-element phase differences; storing the rate of change of the inter-element phase differences between the first time and the second time; and geolocating the signal source based on the rate of change of the inter-element phase differences in the signal at a later time after acquiring the signal. Method 300 may further provide storing inter-element phase differences in at least one non-transitory computer readable storage medium to store the inter-element phase differences; storing the inter-element phase differences between the first time and the second time; and geolocating the signal source based on the inter-element phase differences in the signal simultaneously to acquiring the signal.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The indefinite articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral" and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A geolocation method comprising:
acquiring a signal from a signal source in an antenna receiver having a plurality of antenna elements, and the antenna receiver mounted on a platform;
measuring inter-element phase differences in the signal at a first time;
measuring inter-element phase differences in the signal at a second time;
wherein measuring inter-element phase differences is accomplished by the antenna receiver simultaneously to acquiring the signal;
geolocating the signal source based on a change of the inter-element phase differences in the signal at the first time and the second time; and
providing the signal source geolocation to a recipient.

2. The geolocation method of claim 1, further comprising:
determining a first direction finding (DF) result from the signal at the first time;
determining a first line of bearing to the signal source from the first DF result;
determining a second direction finding (DF) result from the signal at the second time; and
determining a second line of bearing to the signal source from the second DF result.

3. The geolocation method of claim 2, further comprising:
determining the first line of bearing to the signal source based on phase differences across the antenna elements arranged in an array that are spaced apart by a distance more than one-half wavelength at an operating frequency maximum.

4. The geolocation method of claim 3, further comprising:
moving the platform from a first position at the first time to a second position at the second time.

5. The geolocation method of claim 4, further comprising:
determining an angle of arrival (AOA) of the signal at the first time based on the inter-element phase differences at the first time; and
determining a second AOA of the signal at the second time based on the inter-element phase differences.

6. The geolocation method of claim 2, further comprising:
establishing a base line, based on the first DF and the second DF, with more than one-half wavelength at the operating frequency maximum between the antenna elements from a relative distance between the antenna elements for a localized phase.

7. The geolocation method of claim 1, further comprising:
determining the inter-element phase differences between the first time and the second time.

8. The geolocation method of claim 1, further comprising:
geolocating the signal source based on phase interferometry.

9. The geolocation method of claim 1, further comprising:
maintaining the antenna receiver a single functioning state while acquiring the signal and geolocating the signal source.

10. The geolocation method of claim 1, further comprising:

executing geolocation instructions in a processor carried by the antenna receiver on the platform simultaneous to acquiring the signal.

11. The geolocation method of claim 1, further comprising:
storing inter-element phase differences in at least one non-transitory computer readable storage medium to store the inter-element phase differences;
storing the inter-element phase differences of the first time and the second time; and
geolocating the signal source based on the change of the inter-element phase differences in the signal at a later time after acquiring the signal that was simultaneous with measuring inter-element phase difference.

12. The geolocation method of claim 1, further comprising:
storing inter-element phase differences in at least one non-transitory computer readable storage medium to store the inter-element phase differences;
storing the inter-element phase differences of the first time and the second time; and
geolocating the signal source based on the change of the inter-element phase differences in the signal simultaneously to acquiring the signal and measuring inter-element phase differences.

13. A geolocation system comprising:
a moveable platform;
an antenna receiver carried by the platform;
a plurality of antenna elements arranged in an array defining a portion of the antenna receiver;
signal acquisition logic in operative communication with the antenna receiver to acquire a signal, wherein inter-element phase differences of the signal are measured and determined between at least two antenna elements from the plurality of antenna elements from a first position of the platform at a first time to a second position of the platform at a second time, wherein measurement and determination of the inter-element phase differences is accomplished by the antenna receiver simultaneously to signal acquisition; and
geolocation logic in operative communication with the antenna receiver to geolocate a source of the signal based on a change in inter-element phase differences of the signal acquired by the at least two antenna elements between the first position of the platform at the first time and the second position of the platform at the second time.

14. The geolocation system of claim 13, further comprising:
an element spacing distance between two elements in the array that is greater than one-half wavelength at an operating frequency maximum of the signal to be acquired.

15. The geolocation system of claim 14, further comprising:
a processor in operative communication with the geolocation logic; and
at least one non-transitory computer readable storage medium having instructions encoded thereon, that when executed by the processor, implement operations to determine phase differences of the signal between at least two antenna elements and to determine the change in inter-element phase differences of the signal.

16. The geolocation system of claim 15, wherein the operations implemented by the instructions further include:
determine the inter-element phase differences between at least two of the plurality of antenna elements at the first time and the second time.

17. The geolocation system of claim 16, wherein the operations implemented by the instructions further include:
determine the geolocation of the signal source based on the inter-element phase differences in the signal at a later time after the signal is acquired.

18. The geolocation system of claim 17, wherein the operations implemented by the instructions further include:
geolocate the signal source based on the inter-element phase differences in the signal simultaneously to acquiring the signal.

* * * * *